United States Patent
Santan

(10) Patent No.: US 12,259,523 B2
(45) Date of Patent: Mar. 25, 2025

(54) ANTI-SOILING COATING FOR AN OPHTHALMIC LENS

(71) Applicant: Essilor Laboratories of America, Inc., Dallas, TX (US)

(72) Inventor: Prashant Santan, San Diego, CA (US)

(73) Assignee: Essilor Laboratories of America, Inc., Dallas, TX (US)

( * ) Notice: Subject to any disclaimer, the term of this patent is extended or adjusted under 35 U.S.C. 154(b) by 0 days.

(21) Appl. No.: 18/451,172

(22) Filed: Aug. 17, 2023

(65) Prior Publication Data

US 2023/0393308 A1     Dec. 7, 2023

Related U.S. Application Data

(63) Continuation of application No. 16/823,717, filed on Mar. 19, 2020, now Pat. No. 11,774,639.

(60) Provisional application No. 62/820,364, filed on Mar. 19, 2019.

(51) Int. Cl.
| | |
|---|---|
| *G02B 1/18* | (2015.01) |
| *C09D 1/00* | (2006.01) |
| *C09D 5/33* | (2006.01) |
| *C09D 183/08* | (2006.01) |
| *G02B 1/115* | (2015.01) |

(52) U.S. Cl.
CPC ............ *G02B 1/18* (2015.01); *C09D 1/00* (2013.01); *C09D 5/004* (2013.01); *C09D 183/08* (2013.01); *G02B 1/115* (2013.01)

(58) Field of Classification Search
CPC .......... G02B 1/18; G02B 1/115; C09D 5/006; C09D 183/08; C09D 1/00
See application file for complete search history.

(56) References Cited

U.S. PATENT DOCUMENTS

| | | |
|---|---|---|
| 6,506,496 B1 | 1/2003 | Frugier et al. |
| 2003/0116872 A1 | 6/2003 | Klemm et al. |
| 2010/0201940 A1 | 8/2010 | Santan et al. |
| 2011/0228214 A1 | 9/2011 | Von Blanckenhagen |

(Continued)

FOREIGN PATENT DOCUMENTS

| | | |
|---|---|---|
| CN | 106918851 A | 7/2017 |
| JP | 2007-168218 A | 7/2007 |

(Continued)

OTHER PUBLICATIONS

Extended European Search Report issued Nov. 10, 2022 in European Patent Application No. 20773836.0, 12 pages.

(Continued)

*Primary Examiner* — Laura A Auer
(74) *Attorney, Agent, or Firm* — Oblon, McClelland, Maier & Neustadt, L.L.P.

(57) ABSTRACT

A hydrophobic and/or oleophobic coating system for an ophthalmic lens having increased effective thickness and water contact angle. In one embodiment, the hydrophobic and/or oleophobic coating system comprises an anti-reflective coating applied to an ophthalmic lens, the anti-reflective coating comprising alternating layers of high and low index materials with an outer layer of silicon dioxide having exposed hydroxyl groups. A hydrophobic coating is applied to the anti-reflective coating, the hydrophobic coating comprising a silane with a hydrophobic group and fewer than three reactive groups capable of bonding to the exposed hydroxyl groups of the anti-reflective coating.

6 Claims, 1 Drawing Sheet

(56) References Cited

U.S. PATENT DOCUMENTS

| | | |
|---|---|---|
| 2014/0022507 A1 | 1/2014 | Nicolson et al. |
| 2015/0295176 A1 | 10/2015 | Itoh et al. |
| 2015/0309216 A1 | 10/2015 | Fournand |
| 2018/0057927 A1 | 3/2018 | Maccrady et al. |
| 2018/0172884 A1 | 6/2018 | Lapprand et al. |
| 2018/0346751 A1 | 12/2018 | Kim et al. |
| 2019/0352533 A1 | 11/2019 | Jang et al. |

FOREIGN PATENT DOCUMENTS

| | | |
|---|---|---|
| WO | WO 2007/068760 | 6/2007 |
| WO | WVO 2018/036465 A1 | 3/2018 |
| WO | WO 2018/124767 | 7/2018 |

OTHER PUBLICATIONS

Ladilina et al., "Carbofunctional fluorine-containing triethoxysilanes: synthesis, film forming and properties", Russian Chemical Bulletin, International Edition, Springer Science, vol. 54, No. 5, 2005, pp. 1160-1168, XP019224649.

Communication pursuant to Rules 70(2) and 70a(2) EPC issued Nov. 29, 2022 in European Patent Application No. 20773836.0, 1 page.

Daikin, "Production Increases of 4 Times Current Rate for OPTOOL DSX—Meets Need for Protecting Surfaces from Fingerprint Smudges," *Corporate News*, (Jan. 28, 2010).

PCT Patent Application No. PCT/US20/23558, International Search Report and Written Opinion of the International Search Authority, (Jun. 11, 2020).

Combined Chinese Office Action and Search Report issued Nov. 23, 2023, in corresponding Chinese Patent Application No. 202080035360.9 (with English Translation), 16 pages.

Office Action issued Mar. 15, 2024, in corresponding European Patent Application No. 20 773 836.0, 6 pages.

ANTI-SOILING COATING FOR AN OPHTHALMIC LENS

CROSS REFERENCE TO RELATED APPLICATIONS

This application is a continuation application of prior U.S. application Ser. No. 16/823,717, filed Mar. 19, 2020, the disclosure of which is incorporated herein by reference in its entirety. U.S. application Ser. No. 16/823,717 claims the benefit of U.S. Provisional Patent Application No. 62/820,364, filed on Mar. 19, 2019, which is incorporated herein by reference in its entirety.

BACKGROUND OF THE INVENTION

The present invention relates to optical coatings for ophthalmic lenses and, in particular, to hydrophobic and/or oleophobic coating systems for ophthalmic lenses.

Ophthalmic lenses are typically provided with one or more optical coatings that impart improvements to lens performance, such as scratch resistance, anti-reflection, anti-static, and other properties. A final anti-soiling coating is often applied on top of these other coatings, which has hydrophobic and/or oleophobic properties to protect the inner coatings from moisture and to improve the ease of cleaning the surface of the lens. The hydrophobic and/or oleophobic coating also increases the durability of the lens coating system by providing a slick surface for foreign materials to slide off and avoid damage to the surface of the lens.

The hydrophobicity of the coating may be measured by the water contact angle of the surface of the coating—i.e. the angle formed between a tangential line drawn at the point where the outer surface of a drop of water contacts the coating surface. For example, a perfectly spherical drop of water on a surface would rest at a single point on the surface and have a contact angle of 180°. Hydrophobic coatings generally have a water contact angle in excess of 90°. Hydrophobic coatings applied to smooth surfaces can typically achieve water contact angles of up to about 120°. Superhydrophobic surfaces with water contact angles greater than 150° can be achieved using rough surfaces that have micro/nano structures.

Conventional hydrophobic coatings for ophthalmic lenses typically have a maximum water contact angle of about 112° to 113°, which falls well short of the potential maximum water contact angle of about 120° that has been achieved for smooth surfaces. Thus, it would be desirable to provide a hydrophobic coating that more closely approaches the maximum water contact angle of 120°. The increase in hydrophobicity would substantially improve the anti-soiling properties of the coating, and the protection and durability of the inner coating layers of the ophthalmic lens.

SUMMARY OF THE INVENTION

Anti-soiling coating systems for ophthalmic lenses are disclosed, comprising an optical lens, a first coating applied to the lens that comprises an outer layer of silicon dioxide having exposed hydroxyl groups, and a hydrophobic second coating applied to the outer layer of the first coating. The second coating comprises a silane with a fluorinated hydrocarbon group and that has either 1 or 2 functional groups that are reactive to form a bond with the exposed hydroxyl groups of the first coating. In one embodiment, the first coating is an anti-reflective coating comprising alternating layers of high and low index materials. In a preferred embodiment, the layers of high index materials are selected from the group consisting of: $TiO_2$, $ZrO_2$, and $HfO_2$, and the layers of low index materials are selected from the group consisting of: $SiO_2$, $MgF_2$, and $Al_2O_3$. In another embodiment, the functional groups are methoxy groups, and the silane preferably includes an ethoxy group. In another embodiment, the hydrophobic second coating has a water contact angle greater than 113°, preferably between 113° to 114°, and more preferably between 115° to 117°. In another embodiment, the hydrophobic second coating forms a layer with a maximum effective thickness that is greater than 20 nm, preferably at least about 30 nm, and more preferably at least about 40 nm.

DETAILED DESCRIPTION OF THE INVENTION

Anti-soiling coatings systems for ophthalmic lenses are described. Ophthalmic lenses are commonly produced with multiple optical coatings. For example, a hard coating may be applied to the surface of the lens to increase scratch resistance and durability. An anti-reflective coating may be applied on the scratch-resistant coating, to reduce reflections and glare from the surface of the lens. A hydrophobic and/or oleophobic coating may be applied on the anti-reflective coating, to repel water and oils, facilitate cleaning and protect the anti-reflective coating.

Typical hydrophobic coatings include fluorinated compounds, such as fluorinated siloxanes, fluorinated silanes, fluorinated silanols and/or fluorocarbons. Such fluorinated compounds may also be oleophobic in addition to being hydrophobic. The hydrophobic coating may be applied to the surface of the lens by a variety of means known in the art, including vacuum deposition. The hydrophobic coating bonds with or is otherwise strongly adhered to the underlying substrate and is resistant to mechanical removal, such that it is generally not removable by wiping with solvents or similar mechanical means.

Figure 1:
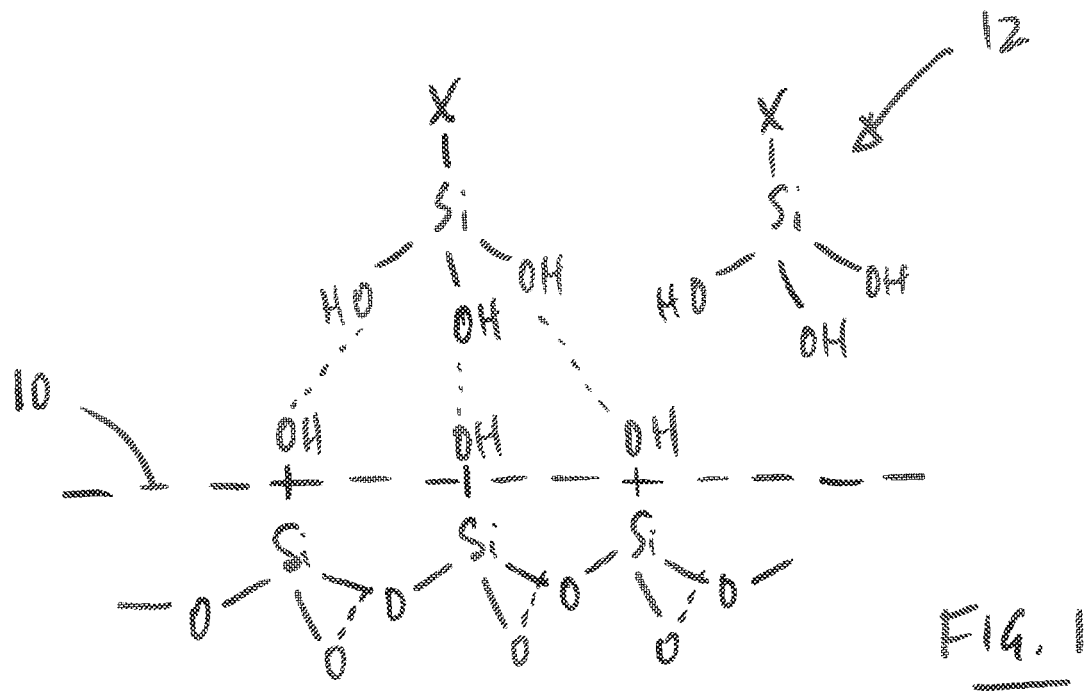
FIG. 1 shows the chemical structure of an anti-soiling coating system comprising a conventional fluorinated silane, applied to a layer of silicon dioxide.

Not wishing to be bound by any particular theory, it is believed that the hydrophobic coating adheres to the substrate through chemical bonds. FIG. 1 shows an example of a hydrophobic coating system, comprising a hydrophobic compound applied to an anti-reflective coating substrate 10. The hydrophobic coating molecule 12 is a silane with a hydrophobic group, such as a fluorinated hydrocarbon (X). Conventional anti-reflective coatings typically comprise alternating layers of high and low index materials. Common high index materials include metal oxides such as TiO2, ZrO2, HfO2, and common low index materials include $SiO_2$, $MgF_2$, $Al_2O_3$. In the embodiment of FIG. 1, the anti-reflective coating has an outer layer of silicon dioxide ($SiO_2$) with exposed hydroxyl (OH) groups. The hydrophobic coating adheres to the anti-reflective coating through hydrogen bonding and/or covalent bonding between the silanol groups of the fluorinated silane and the OH groups of the silicon dioxide layer. Those of skill in the art will appreciate that different substrates and hydrophobic coatings may involve different chemical bonding interactions.

The water contact angle of the hydrophobic coating generally increases as the thickness of the coating is increased. However, there is a point at which the hydrophobicity of the coating peaks and remains essentially constant despite the increasing thickness of the coating. Conventional hydrophobic coatings typically achieve a maximum water contact angle of about 112° to 113° at a coating thickness of about 20 nm. At this thickness, it is believed that the sites available on the substrate to react and form chemical bonds with the hydrophobic coating are effectively saturated, and that additional hydrophobic coating is only weakly adhered and is mechanically removable. Thus, conventional hydrophobic coatings have a maximum effective thickness of about 20 nm, and the application of the hydrophobic material at a thickness greater than 20 nm does not appreciably increase the water contact angle of the hydrophobic coating.

Modification of the hydrophobic compound may allow an increased density of hydrophobic compound molecules that are bonded to the substrate and increase the maximum effective thickness of the hydrophobic coating. Conventional hydrophobic compounds have multiple functional groups that are capable of reacting with and bonding to multiple sites on the substrate. For example, fluorinated silane hydrophobic compounds may have the general formula $CF_3(CF_2)_n(CH_2)_mSi(OR)_3$, where m≥0, n≥1 and is preferably 2, 4 or 6, and R is preferably hydrogen or an alkyl group, such as a methyl group. In the case where R is a hydrogen group, the fluorinated silane has three reactive groups capable of bonding to the OH groups of the substrate, as shown in FIG. 1.

Figure 2:
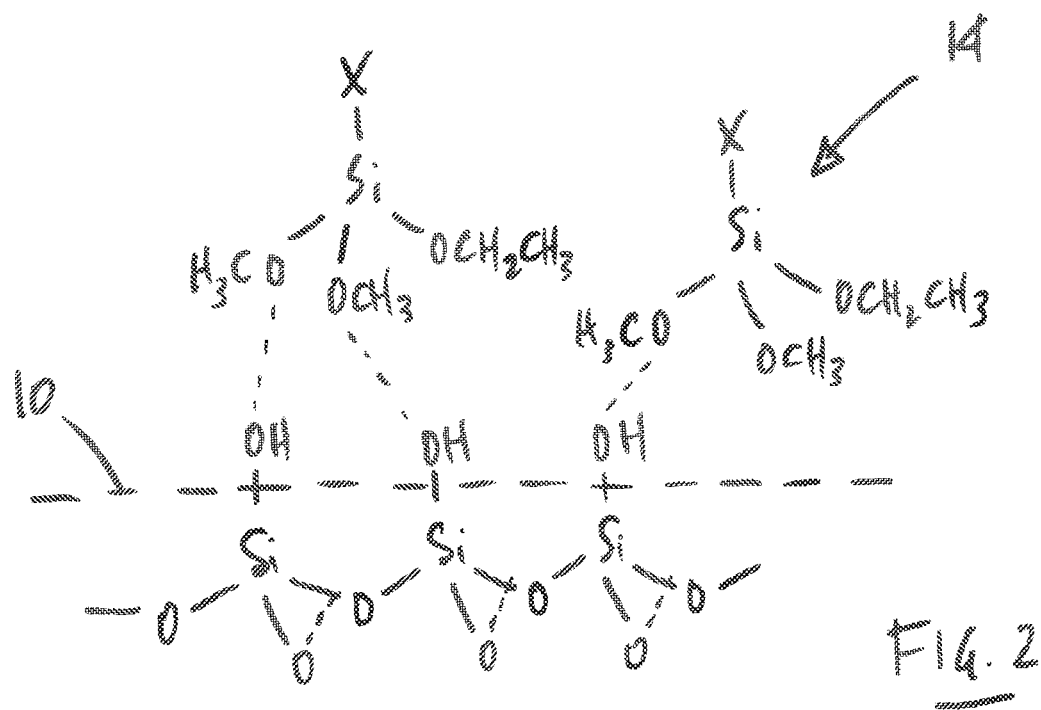
FIG. 2 shows the chemical structure of an embodiment of an anti-soiling coating system comprising a fluorinated silane having two methoxy groups and one ethoxy group, applied to a layer of silicon dioxide.

To increase the density of hydrophobic compound molecules bonded to the surface of the substrate, one or more of the reactive functional groups may be substituted with a less reactive group. FIG. 2 shows an embodiment of a modified hydrophobic compound 14 that occupies fewer binding sites on the substrate 10, which allows additional hydrophobic compound molecules to bond to the substrate. Methoxysilanes can bond to the OH groups of a substrate under anhydrous conditions at elevated temperature, whereas ethoxysilanes are less reactive and may require catalysis. Fluorinated silanes comprising a combination of methoxy and ethoxy groups have a reduced number of functional groups (i.e. less than three, either 1 or 2) that are capable of readily reacting with and bonding to the OH groups of a silicon dioxide substrate, which allows more fluorinated silane molecules to bind to the substrate.

The increased density of hydrophobic compound molecules on the substrate is believed to permit thicker effective hydrophobic coatings with increased water contact angles. Modified hydrophobic compounds with increased maximum effective thickness are commercially available (Kisan Kinzoku Chemicals Co. Ltd., Japan), which comprise a fluorocarbon with reactive groups capable of bonding to the OH groups of a silicon dioxide layer. Table 1 shows the coating thickness and resulting water contact angle for the modified hydrophobic compound.

TABLE 1

| Hydrophobicity | |
|---|---|
| Coating Thickness | Water Contact Angle |
| 20 nm | 111°-112° |
| 30 nm | 113°-114° |

TABLE 1-continued

| Hydrophobicity | |
|---|---|
| Coating Thickness | Water Contact Angle |
| 40 nm | 115°-117° |
| 50 nm | 115°-117° |
| 60 nm | 115°-117° |

The modified hydrophobic compound has a peak water contact angle of 117° at a maximum effective thickness of 40 nm. Thus, the modified hydrophobic compound can be effectively applied in at least twice the thickness of conventional hydrophobic compounds, which results in a substantial increase in water contact angle and hydrophobicity that more closely approaches the potential maximum water contact angle of 120°.

Those of skill in the art will appreciate that the effective thickness of the hydrophobic coating and the maximum water contact angle will vary as a function of the formulation and structure of the hydrophobic compound. Furthermore, the invention is not limited in application to any particular type or form of lens, and may include finished or semi-finished lenses made of any of the various materials known in the art. While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. An anti-soiling coating system for an ophthalmic lens, comprising: an optical lens;
  a first coating applied to the lens, comprising an outer layer of silicon dioxide having exposed hydroxyl groups;
  a hydrophobic second coating applied to the outer layer of the first coating, the second coating comprising a silane of the formula:

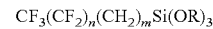

wherein
  m≥0,
  n≥1, and
  R is each independently H or an alkyl group, with the proviso that at least one R group is H or methyl and at least one R group is ethyl or an alkyl group different from methyl and ethyl, and
  wherein a coating thickness of the hydrophobic second coating is 40 nm or more.

2. The anti-soiling coating system of claim 1, wherein the first coating is an anti-reflective coating comprising alternating layers of high and low index materials.

3. The anti-soiling coating system of claim 2, wherein the layers of high index materials are selected from the group consisting of: $TiO_2$, $ZrO_2$ and $HfO_2$, and the layers of low index materials are selected from the group consisting of: $SiO_2$, $MgF_2$, and $Al_2O_3$.

4. The anti-soiling coating system of claim 1, wherein the hydrophobic second coating has a water contact angle of from 115° to 117°.

5. The anti-soiling coating system of claim 1, wherein m is 0 and n is from 1 to 6.

6. The anti-soiling coating system of claim 1, wherein one R is H or methyl, and the remaining R's are ethyl or an alkyl group different from methyl and ethyl.

* * * * *